US011404752B2

(12) United States Patent
Heo et al.

(10) Patent No.: US 11,404,752 B2
(45) Date of Patent: Aug. 2, 2022

(54) CYLINDRICAL SECONDARY BATTERY INCLUDING WELDING POLE

(71) Applicant: LG Chem, Ltd., Seoul (KR)

(72) Inventors: Ha Young Heo, Daejeon (KR); Je Jun Lee, Daejeon (KR); Hyoung Kwon Kim, Daejeon (KR); Hae Jin Lim, Daejeon (KR); Sang Uck Kim, Daejeon (KR)

(73) Assignee: LG Energy Solution, Ltd.

( * ) Notice: Subject to any disclaimer, the term of this patent is extended or adjusted under 35 U.S.C. 154(b) by 79 days.

(21) Appl. No.: 16/613,596

(22) PCT Filed: Dec. 19, 2018

(86) PCT No.: PCT/KR2018/016273
§ 371 (c)(1),
(2) Date: Nov. 14, 2019

(87) PCT Pub. No.: WO2019/124988
PCT Pub. Date: Jun. 27, 2019

(65) Prior Publication Data
US 2020/0152952 A1    May 14, 2020

(30) Foreign Application Priority Data
Dec. 21, 2017  (KR) .................. 10-2017-0176822

(51) Int. Cl.
*H01M 50/538*   (2021.01)
*H01M 10/04*   (2006.01)

(52) U.S. Cl.
CPC ..... *H01M 50/538* (2021.01); *H01M 10/0422* (2013.01); *H01M 10/0431* (2013.01)

(58) Field of Classification Search
CPC ........... H01M 50/538; H01M 10/0422; H01M 10/0431; H01M 50/20; H01M 50/166; H01M 50/107
See application file for complete search history.

(56) References Cited

U.S. PATENT DOCUMENTS 8,974,937 B2 * 3/2015 Park .................... H01M 50/545
429/94
2004/0258987 A1 * 12/2004 Shin ..................... H01M 50/116
429/163

(Continued)

FOREIGN PATENT DOCUMENTS

CN   1738093 A   2/2006
CN   1770544 A   5/2006

(Continued)

OTHER PUBLICATIONS

European Search Report for Application No. 18892318.9, dated Oct. 8, 2020, 7 pages.

(Continued)

*Primary Examiner* — Matthew T Martin
*Assistant Examiner* — Bartholomew A Hornsby
(74) *Attorney, Agent, or Firm* — Lerner, David, Littenberg, Krumholz & Mentlik, LLP

(57) ABSTRACT

A cylindrical secondary battery includes a jelly-roll type electrode assembly, a cylindrical battery case for receiving the jelly-roll type electrode assembly, and a cap assembly mounted to the open upper end of the cylindrical battery case. The jelly-roll type electrode assembly includes a long sheet type positive electrode and a long sheet type negative electrode wound with a separator interposed between the positive electrode and the negative electrode. A welding pole is formed on the bottom surface of the cylindrical battery case so as to extend perpendicularly thereto.

10 Claims, 3 Drawing Sheets

(56) References Cited

U.S. PATENT DOCUMENTS

| | | |
|---|---|---|
| 2006/0024571 A1 | 2/2006 | Kim et al. |
| 2006/0063063 A1* | 3/2006 | Mori .................. H01M 50/463 429/53 |
| 2006/0073380 A1* | 4/2006 | Kim .................. H01M 10/4235 429/129 |
| 2006/0093903 A1 | 5/2006 | Hong et al. |
| 2010/0190056 A1* | 7/2010 | Turner ................ H01M 50/538 429/211 |
| 2010/0209765 A1 | 8/2010 | Bak |
| 2012/0251854 A1 | 10/2012 | Kusama et al. |
| 2012/0308863 A1 | 12/2012 | Masumoto et al. |
| 2013/0230749 A1 | 9/2013 | Kim et al. |
| 2013/0316207 A1 | 11/2013 | Suwa |
| 2016/0248071 A1* | 8/2016 | Jang .................. H01M 10/0431 |
| 2017/0294635 A1 | 10/2017 | Kim et al. |
| 2017/0331142 A1 | 11/2017 | Nicholls |
| 2017/0373339 A1 | 12/2017 | Cho et al. |

FOREIGN PATENT DOCUMENTS

| | | |
|---|---|---|
| CN | 101807710 A | 8/2010 |
| CN | 103299453 A | 9/2013 |
| CN | 107293687 A | 10/2017 |
| EP | 3224896 A1 | 10/2017 |
| JP | H0547413 A | 2/1993 |
| JP | H10135079 A | 5/1998 |
| JP | 2011134641 A | 7/2011 |
| KR | 20050122682 A | 12/2005 |
| KR | 20160074963 A | 6/2016 |
| KR | 20160110610 A | 9/2016 |
| KR | 20160132567 A | 11/2016 |
| KR | 20170005581 A | 1/2017 |
| KR | 20170070542 A | 6/2017 |
| WO | 2012124004 A1 | 9/2012 |

OTHER PUBLICATIONS

International Search Report for Application No. PCT/KR2018/016273, dated Apr. 8, 2019, pp. 1-2.

Search Report dated Apr. 1, 2022 from Office Action for Chinese Application No. 201880030395.6 dated Apr. 13, 2022. 3 pgs. (see p. 2, categorizing the cited references).

* cited by examiner

[FIG. 1]
100
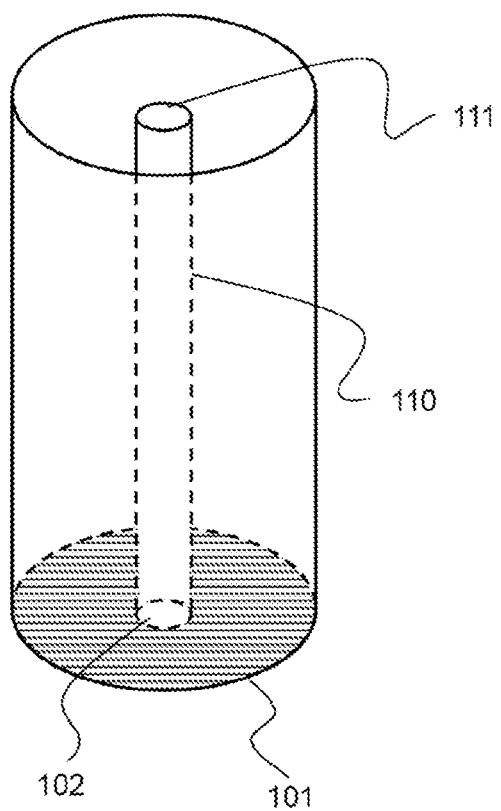

【FIG. 2】
200
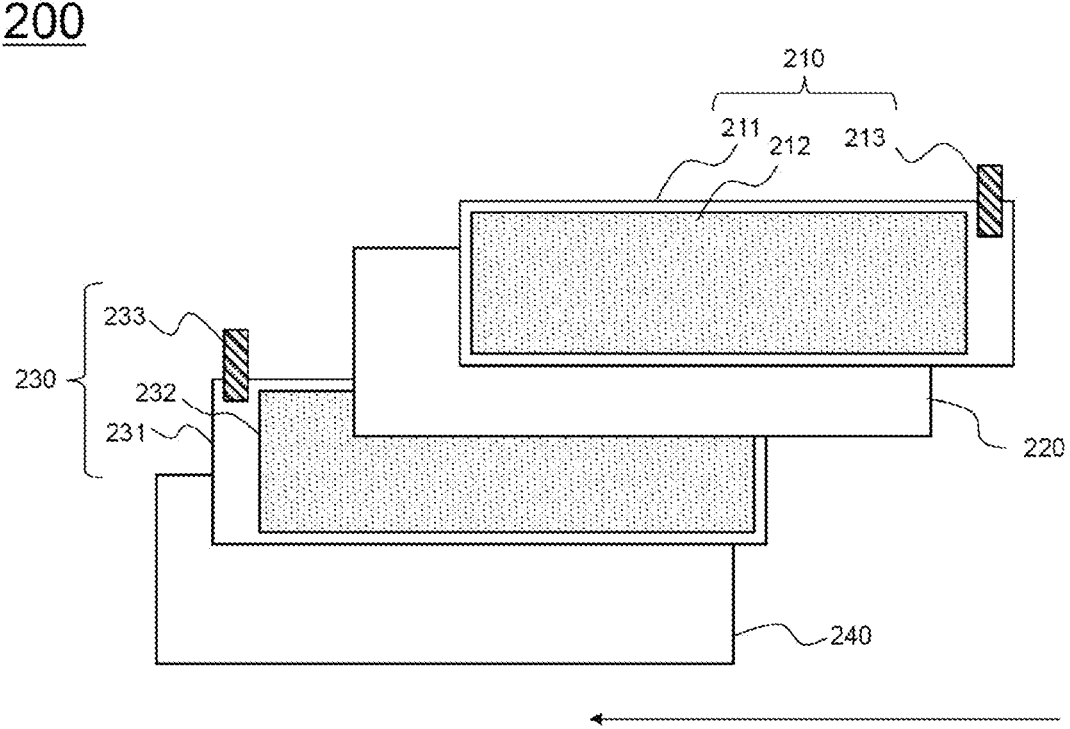

[FIG. 3]
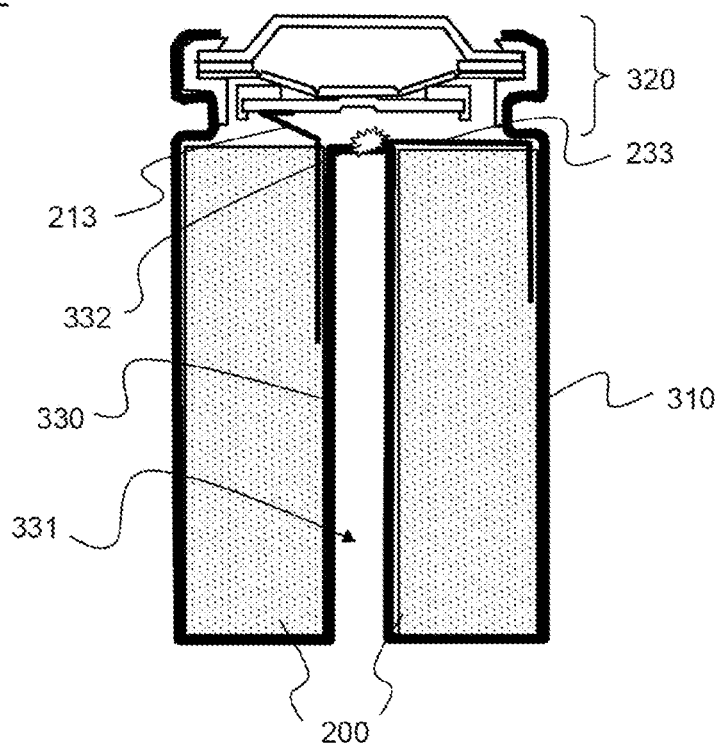

CYLINDRICAL SECONDARY BATTERY INCLUDING WELDING POLE

CROSS-REFERENCE TO RELATED APPLICATIONS

This application is a national phase entry under 35 U.S.C. § 371 of International Application No. PCT/KR2018/016273 filed Dec. 19, 2018, which claims priority from Korean Patent Application No. 10-2017-0176822 filed on Dec. 21, 2017, the disclosures of which are incorporated herein by reference in their entirety.

TECHNICAL FIELD

The present invention relates to a cylindrical secondary battery including a welding pole, and more particularly to a cylindrical secondary battery configured to have a structure in which a welding pole is formed on the bottom surface of a cylindrical battery case so as to be perpendicular thereto in order to easily weld a jelly-roll type electrode assembly to the battery case and to ensure welding strength.

BACKGROUND ART

As mobile devices have been continuously developed and the demand for mobile devices has increased, secondary batteries, which are capable of being charged and discharged, have been widely used as energy sources for mobile devices. In addition, secondary batteries have attracted considerable attention as energy sources for electric vehicles and hybrid electric vehicles, which have been developed to solve problems, such as air pollution, caused by existing gasoline and diesel vehicles using fossil fuels.

In general, based on the shape of a battery case, secondary batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

The electrode assembly, which is mounted in the battery case, is a power generating element that includes a positive electrode, a negative electrode, and a separator that is interposed between the positive electrode and the negative electrode and that can be charged and discharged. The electrode assembly is classified as a jelly-roll type electrode assembly, which is configured to have a structure in which a long sheet type positive electrode and a long sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes. The jelly-roll type electrode assembly has advantages in that it is easy to manufacture the jelly-roll type electrode assembly and the jelly-roll type electrode assembly has high energy density per unit weight. Consequently, the jelly-roll type electrode assembly has been widely used in fields to which it is necessary to use high-capacity secondary batteries.

The cylindrical battery is manufactured so as to have a structure in which the jelly-roll type electrode assembly is received in a cylindrical battery case together with an electrolytic solution. In general, a positive electrode tab protruding upwards from the jelly-roll type electrode assembly is coupled to a cap assembly such that a top cap serves as a positive electrode terminal, and a negative electrode tab protruding downwards from the jelly-roll type electrode assembly is coupled to the battery case such that the battery case serves as a negative electrode terminal.

Since the negative electrode tab is generally attached to the bottom surface of the battery case by welding, it is important to prevent damage to the electrode assembly during a welding process. In order to prevent damage to the electrode assembly, however, it is difficult to use laser welding.

For this reason, resistance welding is used in order to weld the negative electrode tab, and welding is carried out in the state in which a welding rod is inserted into the empty space defined in the central portion of the jelly-roll type electrode assembly. The welding rod is selected based on the size and shape of the central portion of the jelly-roll type electrode assembly. Consequently, it is difficult to use a universal welding rod when welding the negative electrode tab to the battery case.

In connection therewith, Patent Document 1 (Korean Patent Application Publication No. 2005-0122682) discloses a cylindrical lithium secondary battery configured to have a structure in which a negative electrode tab is welded to a lower plate of a cylindrical battery case using a laser, wherein, in order to weld the negative electrode tab, a center pin is inserted into the space defined in the center of an electrode assembly to apply pressure to the negative electrode tab such that the negative electrode tab comes into contact with the lower plate of the battery case.

In other words, a laser welding method is used in Patent Document 1. However, process efficiency is low in that separate members, such as a center pin and a pusher, are used in order to weld the negative electrode tab to the lower plate of the battery case.

Patent Document 2 (Korean Patent Application Publication No. 2016-0132567) discloses a cylindrical lithium secondary battery configured to have a structure in which a negative electrode tab is fixed to the inner circumferential surface of the opening-side end of a battery can. Since the position of a jelly-roll type electrode assembly is not fixed, however, the welded portion of the electrode assembly may be damaged during the use of the battery.

In the case in which a cylindrical secondary battery is used, therefore, there is an urgent necessity for technology that is capable of preventing damage to an electrode assembly when a welding rod is used in order to weld a negative electrode tab to the bottom surface of a battery case, of solving a problem in which it is difficult to universally apply a welding rod to variously sized electrode assemblies, and of fixing the position of the electrode assembly.

DISCLOSURE

Technical Problem

The present invention has been made in view of the above problems and other technical problems that have yet to be resolved. In the case in which a cylindrical secondary battery, configured to have a structure in which a welding pole is formed on the bottom surface of a cylindrical battery case so as to be perpendicular thereto, is used, a negative electrode tab is welded to the welding pole, whereby the battery case serves as a negative electrode terminal, and it is possible to prevent damage to the electrode assembly even though a welding rod is used.

In addition, the welding pole is located at the central portion of the battery case, whereby the position of a jelly-roll type electrode assembly is fixed in the battery case, and therefore it is possible to reduce the likelihood of the electrode assembly being damaged due to external impact.

Technical Solution

In accordance with an aspect of the present invention, the above and other objects can be accomplished by the provision of a cylindrical secondary battery including a jelly-roll type electrode assembly, configured to have a structure in which a long sheet type positive electrode and a long sheet type negative electrode are wound in the state in which a separator is interposed between the positive electrode and the negative electrode; a cylindrical battery case for receiving the jelly-roll type electrode assembly; and a cap assembly mounted to the open upper end of the cylindrical battery case, wherein a welding pole is formed on the bottom surface of the cylindrical battery case so as to be perpendicular thereto.

In general, a cylindrical secondary battery uses a jelly-roll type electrode assembly configured to have a structure in which a long sheet type positive electrode and a long sheet type negative electrode are wound in the state in which a separator is interposed between the positive electrode and the negative electrode, and a positive electrode tab and a negative electrode tab are attached to the jelly-roll type electrode assembly. The positive electrode tab extends upwards so as to be coupled to a cap assembly, and the negative electrode tab extends downwards so as to be coupled to the lower surface of a battery case.

In the cylindrical secondary battery according to the present invention, however, a welding pole having the shape of a cylinder or a polygonal prism is formed on the bottom surface of the cylindrical battery case so as to be perpendicular thereto. A positive electrode tab of the jelly-roll type electrode assembly is coupled to the cap assembly, and a negative electrode tab of the jelly-roll type electrode assembly is coupled to the welding pole. Specifically, the negative electrode tab may be coupled to the uppermost end of the welding pole.

As described above, the welding pole for welding the negative electrode tab is formed in the battery. Consequently, it is possible to solve a conventional problem in which the jelly-roll type electrode assembly is damaged in the process of coupling the negative electrode tab to the bottom surface of the battery case.

In addition, the welding pole is connected to the bottom surface of the cylindrical battery case in the state of being isolated from the cap assembly. Consequently, the battery case may serve as a negative electrode terminal in the same manner as in the conventional art.

The welding pole is located at the winding center of the jelly-roll type electrode assembly. Since the jelly-roll type electrode assembly is located in the space defined between the welding pole and the battery case, it is possible to obtain an effect of fixing the position of the jelly-roll type electrode assembly. Consequently, it is possible to prevent the occurrence of a short circuit due to the destruction of the welded portion of the electrode assembly, which is caused as the result of the electrode assembly being dislocated during the use of the secondary battery or by external impact.

The length of the welding pole may be equal to or greater than the length of the jelly-roll type electrode assembly in the winding-axis direction thereof. Since the upper end of the welding pole is located at the upper end of the jelly-roll type electrode assembly, it is possible to easily weld the negative electrode tab. Moreover, since the upper end of the welding pole is formed as a flat surface that is parallel to the bottom of the battery case, the welding surface of the welding pole is secured, whereby weldability may be improved.

In addition, welding is carried out with respect to the welding pole having a structure that extends so as to protrude upwards, as described above, whereby it is possible to apply various welding methods without using a separate tool such as a welding rod. For example, the negative electrode tab may be coupled to the welding pole by any one of resistance welding, ultrasonic welding, and laser welding.

The cylindrical secondary battery according to the present invention uses a jelly-roll type electrode assembly configured to have a structure in which both a positive electrode tab and a negative electrode tab extend upwards. In order to prevent contact between the positive electrode tab and the negative electrode tab, therefore, it is preferable to dispose the positive electrode tab and the negative electrode tab so as to be spaced apart from each other in a wound state. Specifically, the positive electrode tab of the jelly-roll type electrode assembly may be attached to a winding start portion of a positive electrode sheet, and the negative electrode tab of the jelly-roll type electrode assembly may be attached to a winding end portion of a negative electrode sheet. In the case in which the positive electrode sheet and the negative electrode sheet are wound, therefore, the positive electrode tab is located at the central portion of the electrode assembly, and the negative electrode tab is located at the outside portion of the electrode assembly.

However, the position or number of the positive and negative electrode tabs is not particularly restricted, as long as the structure or arrangement for preventing contact between the positive electrode tab and the negative electrode tab is applicable.

In a concrete example, the cylindrical secondary battery may be configured to have a structure in which a welding pole having the shape of a cylinder or a polygonal prism is attached to the bottom surface of the cylindrical battery case. In this case, a process of forming the cylindrical battery case and attaching the welding pole to the bottom surface of the battery case is necessary.

In another concrete example, the welding pole may be configured to have a structure in which the central portion of the bottom surface of the cylindrical battery case extends so as to protrude upwards.

In other words, the bottom surface of the cylindrical battery case may be formed in the shape of a doughnut when viewed in a plan view, and the central portion of the bottom surface of the cylindrical battery may extend upwards such that the welding pole is configured to have a shape in which the bottom surface of the welding pole is open.

In accordance with another aspect of the present invention, there is provided a battery pack including the cylindrical secondary battery.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and an energy storage system. However, the present invention is not limited thereto.

The structure and manufacturing method of the device are well known in the art to which the present invention pertains, and thus a detailed description thereof will be omitted.

BRIEF DESCRIPTION OF DRAWINGS

FIG. 1 is a perspective view showing a cylindrical battery case according to an embodiment of the present invention.

FIG. 2 is a plan view showing a jelly-roll type electrode assembly according to an embodiment of the present invention before being wound.

FIG. 3 is a vertical sectional view showing a cylindrical secondary battery according to an embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is said to be 'connected' to another part in the following description of the present invention, not only may the one part be directly connected to the another part, but also, the one part may be indirectly connected to the another part via a further part. In addition, that a certain element is 'included' does not mean that other elements are excluded, but means that such elements may be further included unless mentioned otherwise.

Reference will now be made in detail to the preferred embodiments of the present invention, examples of which are illustrated in the accompanying drawings.

FIG. 1 is a perspective view schematically showing a cylindrical battery case according to an embodiment of the present invention.

Referring to FIG. 1, the battery case, denoted by reference numeral 100, is configured in a cylindrical structure having an open upper surface, and a welding pole 110 is formed so as to have a structure in which the central portion 102 of a bottom surface 101 of the battery case extends so as to protrude upwards.

The welding pole 110 is shown in the form of a cylinder. Alternatively, the welding pole may be configured in the form of a polygonal prism. An upper surface 111 of the welding pole is formed as a flat surface that is parallel to the bottom of the battery case.

The bottom surface 102 of the welding pole 110 is formed so as to be open. In the structure in which a cylindrical welding pole is added to the circular bottom surface 101 of the battery case, however, the bottom surface 102 of the welding pole 110 is formed so as not to be open.

FIG. 2 is a plan view schematically showing a jelly-roll type electrode assembly according to an embodiment of the present invention before being wound.

Referring to FIG. 2, the jelly-roll type electrode assembly, denoted by reference numeral 200, is shown. A positive electrode 210, a separator 220, a negative electrode 230, and a separator 240 are wound in the direction indicated by the arrow in the state of being stacked in order to form a jelly-roll type electrode assembly.

The positive electrode 210 is configured such that a positive electrode mixture layer 212 is coated on each of the opposite surfaces of a long sheet type positive electrode current collector 211 and such that a positive electrode tab 213 is attached to a non-coated portion of the positive electrode current collector, on which the positive electrode mixture layer 212 is not coated, so as to protrude upwards.

The negative electrode 230 is configured such that a negative electrode mixture layer 232 is coated on each of the opposite surfaces of a long sheet type negative electrode current collector 231 and such that a negative electrode tab 233 is attached to a non-coated portion of the negative electrode current collector, on which the negative electrode mixture layer 232 is not coated, so as to protrude upwards.

FIG. 3 is a vertical sectional view schematically showing a cylindrical secondary battery according to an embodiment of the present invention.

Referring to FIG. 3, the cylindrical secondary battery, denoted by reference numeral 300, is configured to have a structure in which the jelly-roll type electrode assembly 200 of FIG. 2 is received in a battery case 310 in a wound state.

The battery case 310 is configured so as to have the form of the battery case 100 shown in FIG. 1. The central portion of the bottom surface of the battery case extends upwards so as to form a welding pole 330. The welding pole 330 is configured such that the interior 331 of the welding pole is empty and the lower part of the welding pole is open.

The positive electrode tab 213 extends upwards from the winding center portion of the jelly-roll type electrode assembly 200 so as to be coupled to the lower surface of a cap assembly 320, and the negative electrode tab 233 extends upwards from the winding outer-circumferential portion of the jelly-roll type electrode assembly 200 so as to be coupled to an upper surface 332 of the welding pole 330 by welding.

The welding pole 330 is formed such that the height of the welding pole is equal to or greater than the height of the jelly-roll type electrode assembly 200. Consequently, it is possible to easily weld the negative electrode tab 233 to the welding pole 330.

Those skilled in the art to which the present invention pertains will appreciate that various applications and modifications are possible based on the above description without departing from the scope of the present invention.

DESCRIPTION OF REFERENCE NUMERALS

100: Cylindrical battery case
101: Bottom surface of cylindrical battery case
102: Central portion of bottom surface of cylindrical battery case
110: Welding pole
111: Upper surface of welding pole
200: Jelly-roll type electrode assembly
210: Positive electrode
211: Positive electrode current collector
212: Positive electrode mixture layer
213: Positive electrode tab
220, 240: Separators
230: Negative electrode
231: Negative electrode current collector
232: Negative electrode mixture layer 233: Negative electrode tab
300: Cylindrical secondary battery
310: Battery case
320: Cap assembly
330: Welding pole
331: Interior of welding pole
332: Upper surface of welding pole

INDUSTRIAL APPLICABILITY

As is apparent from the above description, a cylindrical secondary battery, configured such that a welding pole is formed on the bottom surface of a cylindrical battery case for receiving a jelly-roll type electrode assembly so as to be perpendicular thereto, is used as a cylindrical secondary battery according to the present invention. Consequently, it is possible to easily weld a negative electrode tab to the welding pole, whereby it is possible to prevent damage to the electrode assembly and to use various welding methods.

In addition, since the welding process is easily performed, weldability is improved, whereby it is possible to stably fix the negative electrode tab. Furthermore, since the welding pole, which is connected to the battery case, is located at the winding center of the jelly-roll type electrode assembly, it is possible to fix the position of the electrode assembly, whereby it is possible to prevent the destruction of a welded portion of the electrode assembly due to dislocation of the electrode assembly caused by external impact.

The invention claimed is:

1. A cylindrical secondary battery comprising: a jelly-roll type electrode assembly including a long sheet type positive electrode and a long sheet type negative electrode wound about a central winding axis with a separator interposed between the positive electrode and the negative electrode;
   a cylindrical battery case for receiving the jelly-roll type electrode assembly such that the central winding axis of the jelly-roll type electrode assembly is aligned along an axial dimension of the cylindrical battery case; and
   a cap assembly mounted to an open upper end of the cylindrical battery case, wherein a welding pole is formed on a bottom surface of the cylindrical battery case so as to extend away from the bottom surface along the axial dimension to a terminal upper end of the welding pole spaced away from the bottom surface,
   the jelly-roll type electrode assembly has a bottom end and a top end opposing one another along the longitudinal dimension, with the bottom end of the jelly-roll type electrode assembly being positioned closer to the bottom surface of the cylindrical battery case than the top end,
a positive electrode tab of the jelly-roll type electrode assembly extends from the top end of the jelly-roll type electrode assembly so as to be electrically coupled to of the cap assembly, and
   a negative electrode tab of the jelly-roll type electrode assembly extends from the top end of the jelly-roll type electrode assembly so as to be electrically coupled to of the terminal upper end of the welding pole,
   the welding pole is hollow and defined by a central portion of the bottom surface of the cylindrical battery case extending upwardly along the axial dimension to circumscribe an interior volume that communicates with an exterior of the cylindrical secondary battery via an open region defined in the bottom surface by the upward extension of the central portion, such that the cylindrical battery case defines an annular structure.

2. The cylindrical secondary battery according to claim 1, wherein the welding pole is located at the central winding axis about which the jelly-roll type electrode assembly is wound.

3. The cylindrical secondary battery according to claim 1, wherein a length of the welding pole is equal to or greater than a length of the jelly-roll type electrode assembly along the axial dimension.

4. The cylindrical secondary battery according to claim 1, wherein the negative electrode tab is coupled to the welding pole by resistance welding, ultrasonic welding, or laser welding.

5. The cylindrical secondary battery according to claim 1, wherein
   the positive electrode tab of the jelly-roll type electrode assembly is attached to a first end portion of the positive electrode corresponding to a location where the winding of the jelly-roll type electrode assembly starts, and
   the negative electrode tab of the jelly-roll type electrode assembly is attached to a second end portion of the negative electrode corresponding to a location where the winding of the jelly-roll type electrode assembly ends.

6. The cylindrical secondary battery according to claim 1, wherein the welding pole is defined by a central portion of the bottom surface of the cylindrical battery case that extends upwardly along the axial dimension.

7. A battery pack comprising the cylindrical secondary battery according to claim 1.

8. The cylindrical secondary battery according to claim 1, wherein the welding pole is hollow such that an open interior space is defined inside the welding pole.

9. The cylindrical secondary battery according to claim 8, wherein the bottom surface of the cylindrical battery case has an opening communicating with the open interior space inside the welding pole.

10. The cylindrical secondary battery according to claim 1, wherein the jelly-roll type electrode assembly has an annular cylindrical shape, and wherein the positive electrode tab is attached to the positive electrode at a radially inner portion of the electrode assembly, and the negative electrode tab is attached to the negative electrode at a radially outer portion of the electrode assembly.

* * * * *